June 7, 1966   JINICHI SHIMIZU   3,254,768
FILTERING APPARATUS
Filed Sept. 9, 1963
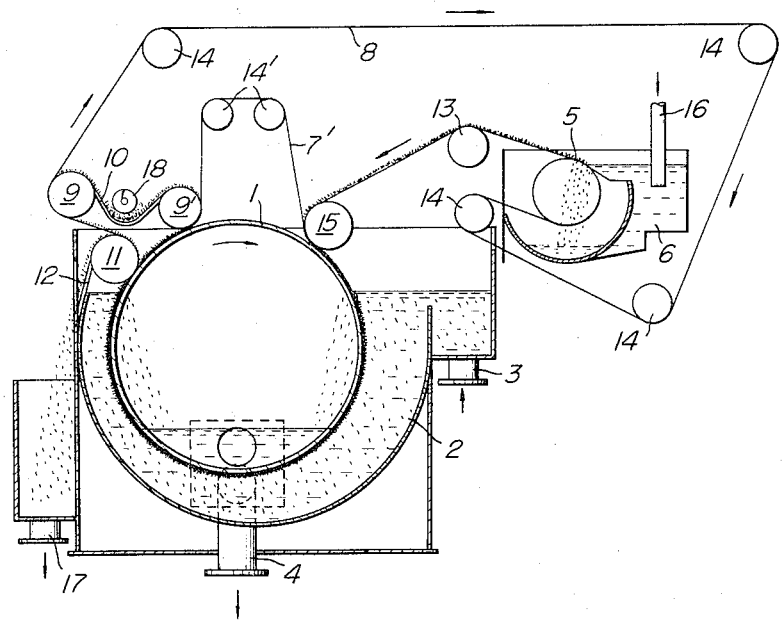
INVENTOR
Jinichi Shimizu
BY
ATTORNEYS United States Patent Office 3,254,768
Patented June 7, 1966

3,254,768
FILTERING APPARATUS
Jinichi Shimizu, 47 Kishimachi-6-chome,
Urawa-shi, Japan
Filed Sept. 9, 1963, Ser. No. 307,565
Claims priority, application Japan, Sept. 12, 1962,
37/39,253
4 Claims. (Cl. 210—193)

The present invention relates to a filtering apparatus. More specifically, the invention relates to a new and improved filtering apparatus for use in recovering raw materials contained in white water, such as the raw materials used in pulp industries, in producing filtered water for factory use, or in filtering contaminated water in factories before it is exhausted into a river.

A primary object of the present invention is to provide a new and improved filtering apparatus in which two net members, one being an inner net member and the other an outer net member, are provided for movement through a reservoir charged with liquid to be filtered and between the two net members is sandwiched a layer of filtering material which filters the liquid in the reservoir, whereby solids present in the liquid are made to adhere onto the outer surface of said outer net member.

Another object of the present invention is to provide a new and improved filtering apparatus in which an inner net member and an outer net member are kept in an overlapped position by a main cylinder carrying said inner net member, a roller guiding said outer net member onto said inner net member, and another roller guiding said outer net member away from said inner net member, said inner net member being carried by said main cylinder and guided by guide rollers disposed apart from said main cylinder.

Still another object is to provide an improved apparatus wherein a filtering material sandwiched between the inner net member and the outer net member is supplied onto the inside surface of said outer net member before said outer net member is placed over said inner net member.

A more specific object of the present invention is to provide an apparatus in which the filtering material passed through the liquid to be filtered is picked up by rollers, collected by doctors, and transferred back to where it came from by a conveyor and other appropriate means for reuse, while solids to be removed adhered on a net member are separately picked up and collected by other means, namely, a roller and a doctor, etc.

With these and other objects in view, the apparatus according to the present invention comprises a reservoir charged with liquid to be filtered, an inner net member movably disposed in said reservoir, an outer net member carried around said inner net member, a means for supplying a filtering material onto said outer net member to form a layer of said filtering material, and a means for placing said outer net member over said inner net member, said outer net member and said inner net member holding therebetween said layer of said filtering material while moving through said liquid in said reservoir, whereby solids present in the liquid in said reservoir are made to adhere onto the outer surface of said outer net member.

The features of the present invention which are believed to be novel are set out further with particularlity in the appended claims. The construction and manner of operation of the invention, together with other objects and advantages thereof, may best be understood by reference to the following description and accompanying drawing.

The single figure in the drawing is a longitudinal sectional view of a preferred embodiment of the present invention wherein some of the elements, such as roller mechanisms, are shown diagrammatically.

Referring now to the drawing, there is shown in the single figure an apparatus according to the present invention wherein the numeral 1 indicates a perforated main cylinder, 2 a reservoir, 3 an inlet for water to be filtered, 4 an outlet pipe for filtered water, 5 a perforated side cylinder, 6 a tank charged with a liquid containing a filtering material, 7 an inner net member, 8 an outer net member, 9 an outer pick-up roller for picking up the used filtering material adhered on the outer net member, 9' an inner pick-up roller for picking up the used filtering material adhered on the inner net member, 10 a doctor for scraping off the used filtering material picked up by said rollers 9 and 9', 11 an outlet roller picking up solids adhered on the outer net member while guiding the outer net member away from the inner net member, 12 a doctor for scraping off solids picked up by said outlet roller, 13 as well as 14 or 14' a guide roller for positioning and tensioning said outer net member, 15 an inlet roller for guiding said outer net member on to said inner net member, 16 an inlet pipe for said liquid containing said filtering material, 17 an exhaust pipe for the collected solids, and 18 a conveyor for transferring the collected filtering material for reuse.

In the preferred embodiment according to the present invention, the perforated main cylinder 1 carries the inner net member 7 and over said inner net member 7 is placed in an overlapped relationship the outer net member 8 which is in the form of an endless belt net. A means for placing said outer net member over said inner net member includes said perforated main cylinder 1 carrying said inner net member 7, the inlet roller 15 guiding said outer net member 8 on to said inner net member 7, and the outlet roller 11 guiding said outer net member 8 away from said inner net member 7.

Between said outer net member 8 and said inner net member 7 is sandwiched a layer of the filtering material. The filtering material is supplied onto said outer net member 8 at its inside surface to form said layer of the material by a means which includes the tank 6 charged with the liquid containing said material and the perforated side cylinder 5 carrying said outer net member 8, the outside or underside surface of said net member 8 being in contact with the cylindrical surface of said side cylinder 5. The construction of the means is in such a way that said filtering material in said tank 6 adheres onto the inside or upside surface of said outer net member 8 as said outer net member 8 passes through said tank 6.

The outer pick-up roller 9 is spaced apart from said iner net member 7 while the inner pick-up roller 9' is in contact with said inner net member 7. Said outer pick-up roller 9 is for picking up the used filtering material adhered on said outer net member 8 whereas said inner pick-up roller 9' is for picking up the same adhered on said inner net member 7. Between the two pick-up rollers 9 and 9' are provided the doctor 10 and the conveyor 18, the former for scraping off said used filtering material and the latter for transferring said used filtering material scraped off by said doctor 10 for reuse.

Opposite from the position of the inlet roller 15 is located the outlet roller 11 which picks up the solids adhered on the outside surface of said outer net member 8 while guiding said outer net member 8 away from said inner net member 7. Said outlet roller 11 is engaged with the doctor 12 which scrapes off the solids picked up by said outlet roller 11.

The inner net member 7 is in the form of an endless belt net being guided by the guide rollers 14' disposed apart from said main cylinder 1. That portion of the inner net member 7 which is kept away from the main cylinder 1 is easily accessible for the cleaning thereof such as by spraying water into said portions of the member. Also, since the layer of filtering material formed on the outer net member 8 meets with the inner net member 7 at a point not lower than the horizontal plane intersecting the axis of the inlet roller 15, the layer can be fed between the two net members with the layer being undisturbed by gravity. For the same reason, the layer of the used filtering material parts from the inner net member 7 without tending to remain on the inner net member 7.

During operation, the outer net member 8 together with the inner net member 7 moves in the direction of the arrows. As the portion of said outer net member 8 that is carried by the side cylinder 5 passes through the tank 6, a thin layer of the filtering material is formed on the inside or upside surface of said outer net member 8. Said layer of the filtering material is then sandwiched between said outer net member 8 and said inner net member 7 and moves down into the water in the reservoir 2. While the main cylinder 1 rotates in the direction of the arrow, the solids in the liquid stick to the outside surface of said outer net member 8 while the liquid filters into said main cylinder 1. The filtered liquid is exhausted through the outlet pipe 4. The solids adhered on the outside surface of said outer net member 8 are scraped off by means of the doctor 12 at the outlet roller 11 and removed through the exhaust pipe 17. The used filtering material held by the two net members 8 and 7 is divided, as they part from each other, into two layers, one remaining on the surface of said inner net member 7 and the other remaining on the inside surface of said outer net member 8. The used filtering material remaining on the outer net member is picked up by the outer pick-up roller 9 while that remaining on the inner net member is picked up by the inner pick-up roller 9'. The doctor 10 scrapes off and the conveyor 18 carries away the picked-up filtering material. The collected filtering material is added with a proper quantity of liquid and is fed back to the inlet pipe 16, thus enabling the circulation and the reuse of the filtering material.

In the apparatus according to the present invention, as described above, the filtering material can be used over and over again by circulation without being mixed with solids to be removed. Therefore, the apparatus affords an efficient and economical operation and a wide variety of applications.

While the form of apparatus shown and described herein is admirably adapted to fulfill the objects primarily stated, it is to be understood that it is not intended to confine the invention to the particular embodiment disclosed herein, for it is susceptible of modification in various other forms. As an example, it is possible to construct the main cylinder of the present apparatus in such a way that the part in contact with the liquid in the reservoir is under vacuum, thus providing an increase in the filtration capacity.

It is obvious from the above that many other modifications may be made, depending on the requirements governing the use of the apparatus, and it will be apparent that modification and variations thereof may be made without departing from the underlying principles of the invention.

What is claimed is:

1. A filtering apparatus comprising a reservoir charged with liquid to be filtered, an inner net member movably disposed in said reservoir, an outer net member carried around said inner net member, a means for supplying a filtering material onto said outer net member to form a layer of said filtering material, and a means for placing said outer net member over said inner net member, said means for placing said outer net member over said inner net member including a perforated main cylinder carrying said inner net member, an inlet roller guiding said outer net member to said inner net member, and an outer roller guiding said outer net member away from said inner net member, said inner net member being in the form of an endless belt net and carried by said perforated main cylinder around its cylindrical surface and over a guide roller disposed apart from said main cylinder, said outer net member and said inner net member holding therebetween said layer of said filtering material while moving through said liquid in said reservoir, whereby solids present in the liquid in said reservoir are made to adhere onto the outer surface of said outer net member.

2. A filtering apparatus according to claim 1 in which said means for supplying said filtering material includes a tank charged with a liquid containing said filtering material and a perforated side cylinder carrying said outer net member with the outside surface of said outer net member in contact with the cylindrical surface of said side cylinder, whereby said filtering material is made to adhere onto the inside surface of said outer net member while said outer net member passes through said tank.

3. A filtering apparatus according to claim 1 wherein the apparatus further comprises an outer pick-up roller for picking up the used filtering material adhered on said outer net member, an inner pick-up roller for picking up the used filtering material adhered on said inner net member, a doctor engaging said outer pick-up roller and said inner pick-up roller for scraping off said used filtering material, and a conveyor provided between said outer pick-up roller and said inner pick-up roller and adapted to carry away said used filtering material for reuse.

4. A filtering apparatus according to claim 1 in which said outlet roller is adapted to pick up the solids adhered on said outer net member and is engaged with a doctor scraping off said solids picked up by said outlet roller.

References Cited by the Examiner

UNITED STATES PATENTS

| | | | |
|---|---|---|---|
| 2,426,886 | 9/1947 | Komline | 210—77 |
| 2,669,360 | 2/1954 | Little | 210—396 |
| 2,963,160 | 12/1960 | Wennberg | 210—193 |

FOREIGN PATENTS 509,930  10/1930  Germany.

REUBEN FRIEDMAN, *Primary Examiner.*

J. L. DE CESARE, *Assistant Examiner.*